T. P. McDERMOTT.
SEPARATOR.
APPLICATION FILED JULY 17, 1913.

1,121,270.

Patented Dec. 15, 1914.
2 SHEETS—SHEET 1.

WITNESSES:
Ludger A. Nicol.
Vera J. Freeman.

INVENTOR.
Thomas P. McDermott
BY Gardner W. Pierson
ATTORNEY.

T. P. McDERMOTT.
SEPARATOR.
APPLICATION FILED JULY 17, 1913.

1,121,270.

Patented Dec. 15, 1914.
2 SHEETS—SHEET 2.

WITNESSES:

INVENTOR.
Thomas P. McDermott
BY
ATTORNEY.

UNITED STATES PATENT OFFICE.

THOMAS P. McDERMOTT, OF LOWELL, MASSACHUSETTS, ASSIGNOR OF ONE-HALF TO PETER A. McNIFF, OF LOWELL, MASSACHUSETTS.

SEPARATOR.

1,121,270.  Specification of Letters Patent.  Patented Dec. 15, 1914.

Application filed July 17, 1913. Serial No. 779,503.

*To all whom it may concern:*

Be it known that I, THOMAS P. McDERMOTT, a citizen of the United States, residing at Lowell, in the county of Middlesex and State of Massachusetts, have invented certain new and useful Improvements in Separators, of which the following is a specification.

This invention relates to devices for separating liquids of different specific gravity or solids from liquids. It may be described as a settling tank or trap. It may be more generally described as a separator. Such separator can be used for various purposes as for instance to separate grease from water in drains especially such drains as come from the sinks of restaurants, hotels, etc., the purpose being to prevent oil and grease from getting into the main sewer, thereby being lost and also stopping up the sewer. My separator is also useful in garages where it is desirable to prevent gasolene or other volatile inflammable liquid from running into the sewer whereby there may be danger of an explosion. It may also be used in such places to recover oil which drips or otherwise gets upon the floor and would naturally be lost in the sewer and to retain sand, dirt, etc., and to keep it out of the sewer.

The principal features of my device are a tank having an outlet provided with a trap of any suitable form, and a settling vessel inside of the tank which has no contact with the tank, except at certain supporting points, and an inlet and outlet for such vessel.

Figure 1:
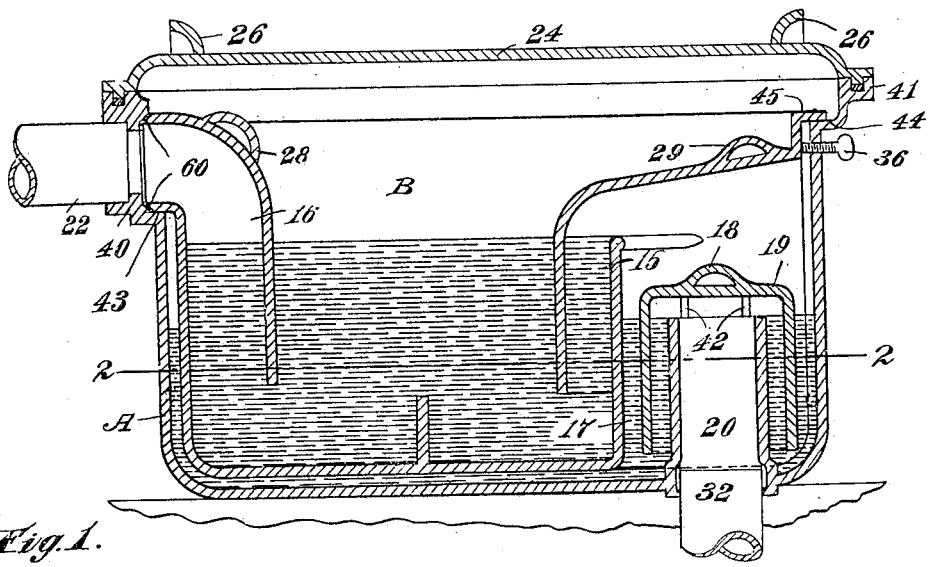
Figure 2:
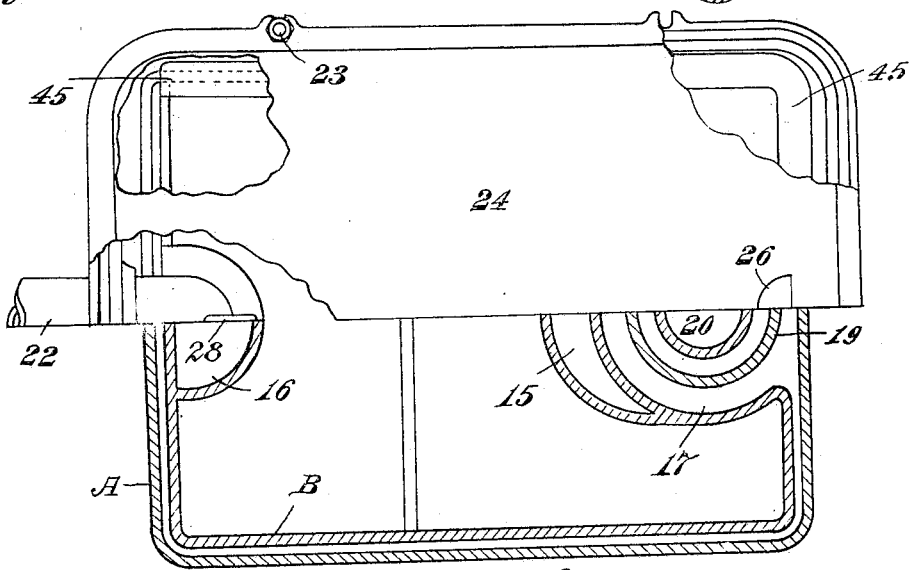
Figure 3:
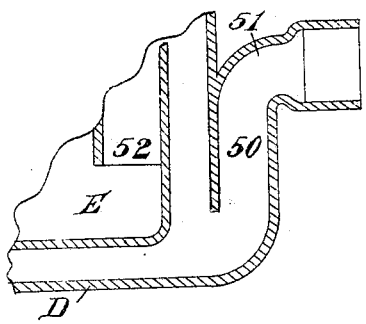
Figure 4:
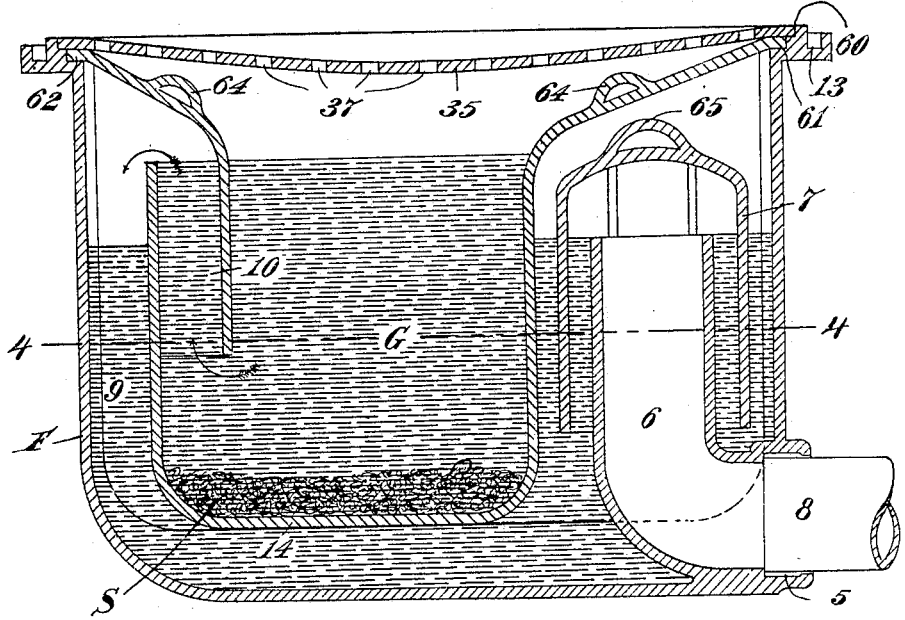
Figure 5:
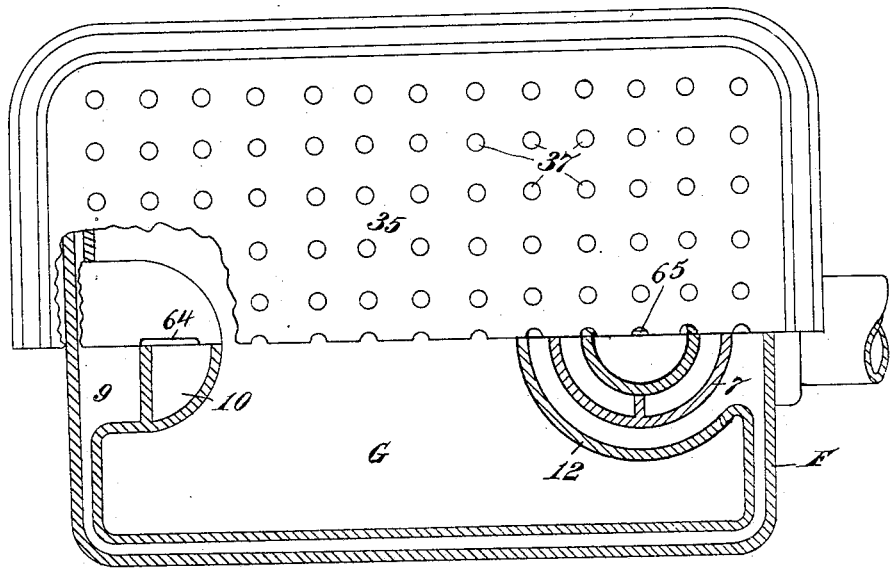

In the drawings, Figure 1 is a sectional elevation of my separator from the side. Fig. 2 is a plan with the lower half shown in a longitudinal section as it would appear on line 2, 2 of Fig. 1 and with other parts broken away. Fig. 3 is a sectional elevation from the side of modified construction with a different form of outlet trap. Fig. 4 is a sectional elevation of a modified form of my device and Fig. 5 is a plan view of the modified form shown in Fig. 4, the lower half being shown in section on the line 4, 4 of Fig. 4 and other parts being shown broken away.

Referring to Fig. 1, A is a tank which ordinarily would rest on the floor but may be sunk in the ground or under the floor. This tank near the top at one side has a nipple 40 to receive the threaded end of inlet pipe 22. A hub or other similar device may be used in place of the nipple. This pipe 22 may be connected with the outlet of a sink or other similar place. Upon the top edge 41 of tank A, I fasten a tight cover 24 by bolts or screws 23. This cover 24 preferably has handles 26 by which it can be removed when desired. At the opposite lower end from inlet 22 is an outlet pipe 32 which connects with a vertical trap outlet 20 cast integral with tank A over which I prefer to place a cover 19 with a handle 18 having interior supporting ribs 42 at the top as shown. This cover 19 when in place on the trap outlet 20 forms a trap which will prevent any foul gases working backward from the sewer into which outlet 32 enters. Below nipple 40 is a semi-circular shoulder 43 and at the opposite end of tank A under edge 41 is a shelf 44 to support the rim 45 of the settling vessel B. This settling vessel B is smaller on all sides than tank A and is of a less depth so that it can never become stuck to tank A whereby it might be prevented from being readily removed. The inlet into vessel B is a pipe or channel 16 cast integral therewith which fits the inside tapering end of nipple 40 being tapered at 60 so as to make a joint therewith which will be perfectly tight. There should be distance enough between the end walls of settling vessel B and tank A so that B can slide sufficiently to permit the end 60 of inlet 16 to be withdrawn from the inside end of nipple 40 when it is desired to remove the settling vessel from the tank. The rim 45 of vessel B extends around both sides as well as at one end as shown, or it may be arranged in any other desirable way for supporting or suspending vessel B from the top edge of tank A. Rim 45 should fit fairly close to the inner part of edge 41 of tank A but should project over only one end of shelf 44 so as to allow vessel B to be longitudinally slidable to connect or disconnect inlet pipe 16 with nipple 40. To insure a tight connection at this point, I provide a thumb screw 36 which bears against the end of vessel B which is opposite from inlet 16 whereby the vessel may be forced along until a tight joint is made. The inlet 16 is extended downward well toward the bottom of vessel B and at the opposite end is an outlet 15 which extends down to a similar point. This vessel outlet 15 is preferably cast integral with vessel B as is inlet 16. See Fig. 1. Vessel B is also preferably cast with a trap chamber 17 within which there is ample room for the trap. When in operation this trap chamber 17 is substantially air tight at the top and as the liquid rises in the bottom, a dead air space is formed at the top of this chamber and as it is located between the vertical outlet 15 which acts substantially as a trap or seal for vessel B and the trap for the tank, it tends to keep each trap from siphoning and makes it practically impossible for both traps to siphon and thus break the water seals. These two seals with the dead air space between are therefore very necessary. Handles 28 and 29 are provided on vessel B whereby when thumb screw 36 is loosened, the vessel may be drawn over and lifted out entirely clear from tank A.

The operation is as follows: The water mixed with grease passes through pipe 22 and inlet 16 thence upward into the body of vessel B where the grease rises to the top and the water continues to flow along the bottom up through outlet 15 over into trap chamber 17 down under the bottom edges of cover 19 up under the cover and down into outlet 20 to sewer pipe 32.

It will be observed that if vessel B is removed, trap cover 18 can also be removed so that the entire interior of the device is open for cleaning. It is better to leave the trap cover in place so as to preserve the water seal while the settling vessel is being cleaned and to remove it for as brief a period as possible. With this construction, when it is desired to clean out the grease, cover 24 is removed and vessel B is carried bodily out doors or into some place where smells will not be offensive while the grease is being cleaned out. The vessel is also cleaned or washed and then returned to its place after which cover 24 is screwed back. At the same time, the interior of tank A may properly be cleaned. The trap may also be cleaned at the same time.

A slight modification of this construction is shown in Fig. 3 wherein D represents the tank and E the settling vessel. In this case, the outlet 50 is at the bottom of the end of tank D and runs up vertically as shown making an elbow at 51 where it connects with the sewer pipe. Outlet 50 is cast integral with tank D. This is a simple form of trap and may be useful in some cases. In this construction, the shape of vessel E conforms to that of tank D as shown. It has the necessary space between its sides and bottom and the tank and has the removable coupling with the inlet pipe, the top supporting rim and the cover as in the other construction. 52 is the vessel outlet which corresponds with 15.

Another form of my device is shown in Figs. 4 and 5 wherein F represents the tank which is set at a low point in the floor, as for instance of a garage, so that the removable tank cover 35 which is concave and perforated with holes 37 will be flush with the floor. A channel 13 may be used to assist in making a tight cement or leaded joint with the floor. The edges of this tank cover rest in the channel 60 around the upper edge of tank F over channel 61 in which the supporting rim of settling vessel G rests.

Tank F has an outlet 6 cast integral therewith which extends upward forming part of a trap similar to the one shown in Figs. 1 and 2 provided with a removable cover 7 with a handle 65 as shown. Outlet 6 connects by a suitable joint 5 with a sewer pipe 8.

The settling vessel G is of such size that there will be a space all around it and so that it will be some little distance above the bottom of tank F. By means of its top supporting rim 62 which rests in channel 61, it is suspended at the top. It is so shaped that at 12, it conforms to the contour of the outlet trap leaving a clear space between for the flow of the liquid. At the other end is a passage or partition 10 which extends down to near the bottom and connects with another passage or channel 9 both preferably cast integral with and together forming the outlet from vessel G. Preferably handles 64, 64 are provided for removing vessel G. The operation of this device is as follows:—Water mixed with gasolene, oil, sand, etc., flows into vessel G through the holes 37 in cover 35 and the heavy substances such as sand S settle at the bottom 14. The light substances such as gasolene and oil float at the top of vessel G so that only the water passes down in the direction of the arrow up through 10, down through 9, under or around vessel G, up under cover 7, out through trap outlet 6, into the sewer pipe 8. With this device, it is desirable that the gasolene should be kept out of the sewer and should be evaporated. This result is accomplished by reason of the fact that it rises to the top and remains there until it gradually evaporates through the holes 37. The oil also rises to the top and can be recovered by removing cover 35 and dipping it off or skimming it.

When it is desired to clean the device, the vessel G can be readily lifted out by the handles and thoroughly cleaned while at the same time the trap cover 7 can be lifted out and the trap cleaned.

Preferably the inlets and outlets of my tanks and settling vessels are cast integral with the body thereof but other constructions may be used.

The principal features of my separator are the settling vessel hung from its top to the top of the tank with a substantially air tight connection and of such size that there is an air space between the settling vessel and the tank except at the top, also vertical outlets which leave respectively near the bottom of the vessel and the tank which form water seals for each with a dead air space between, all outlets and other parts being cast integral wherever possible to prevent leaks. The outlet of the tank may be considered the bottom of the cover 19 or 7 or the bottom of pipe 50 of Fig. 3. The trap being the vertical pipe 20 or 6 or 50 each of which is cast integral with the tank.

What I claim as my invention and desire to cover by Letters Patent, is:

1. In a separator, the combination of a tank having an inlet nipple near the top and an outlet near the bottom formed of a vertical pipe cast integral with the tank, with a settling vessel which has a rim which projects at the top and rests on the top edge of the tank and which is of such size as to have a clear space between it and the tank on all sides and at the bottom and is slidable lengthwise of the tank, an outlet from the settling vessel cast integral therewith which leaves near the bottom and extends up to the top where it enters the tank near the top thereof, together with an inlet to such settling vessel in engagement with the inlet nipple, and means for causing the settling vessel to slide.

2. In a separator, the combination of a tank having an inlet nipple and an outlet near the bottom, and a trap for such outlet, with a settling vessel which has an inlet in operative relation with the inlet nipple of the tank and which is slidably suspended at its top from the top edge of the tank in such a manner that there is a clear space between them on all sides and at the bottom, together with a thumb screw which passes through the tank and engages the vessel at the end opposite the inlet, and an outlet from the vessel which leaves near the bottom.

3. In a separator, the combination of a tank having an outlet at the bottom, and a trap for such outlet, with a removable settling vessel inside of said tank, together with an inlet to such settling vessel, and an outlet therefrom which leaves near the bottom.

4. In a separator, the combination of a tank having an inlet nipple and an outlet near the bottom, and a trap for such outlet, with a settling vessel slidable in the tank and having an inlet which engages the tank inlet nipple, means for so engaging the tank inlet nipple with the vessel inlet, and an outlet from the settling vessel which leaves near the bottom.

5. In a separator, the combination of a tank having an outlet at the bottom, and a trap for such outlet, with a removable settling vessel inside of said tank having a top rim which rests on the top edge of the tank, together with an inlet to such settling vessel, and an outlet therefrom which leaves near the bottom.

In testimony whereof I, hereto affix my signature in presence of two witnesses.

THOMAS P. McDERMOTT.

Witnesses:
GARDNER W. PEARSON,
PETER A. McNIFF.